(12) United States Patent
Moll et al.

(10) Patent No.: US 8,635,550 B2
(45) Date of Patent: Jan. 21, 2014

(54) GUI FOR GOAL PROGRAMMING AND GOAL WEIGHTING IN OPTIMIZATION BASED APPLICATIONS

(75) Inventors: Georges-Henri Moll, Villeneuve-Loubet (FR); Thomas Baudel, Paris (FR)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 13/104,689

(22) Filed: May 10, 2011

(65) Prior Publication Data
US 2012/0290963 A1    Nov. 15, 2012

(51) Int. Cl.
*G06F 3/048*    (2013.01)
(52) U.S. Cl.
USPC .......................................... 715/771; 715/712
(58) Field of Classification Search
USPC .................................. 715/771, 712
See application file for complete search history.

(56) References Cited

U.S. PATENT DOCUMENTS

| | | | | |
|---|---|---|---|---|
| 5,819,243 A * | 10/1998 | Rich et al. | ......................... | 706/11 |
| 8,046,704 B2 * | 10/2011 | Santos et al. | ................... | 715/764 |
| 8,330,759 B1 * | 12/2012 | Besbeas et al. | ................ | 345/440 |
| 2009/0182580 A1 * | 7/2009 | Martin et al. | ...................... | 705/3 |
| 2009/0199113 A1 * | 8/2009 | McWhinnie et al. | .......... | 715/762 |

* cited by examiner

*Primary Examiner* — Omar Abdul-Ali
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to mathematical programming for optimization based applications systems and provide a method, system and computer program product for providing an interface for generating and customizing optimization-based applications. A method for providing an interface for generating and customizing optimization-based applications can include generating an initial user interface having an objectives and sequences panel, the objectives and sequences panel can include a basic objective table, an aggregate objective table and an objective sequence table in a goal programming and goal weighting controller module executing in memory by a processor of a host computer. The method also includes rendering in the basic objective table a list of goals with corresponding indexes provided by the optimization application. The method further includes receiving selection of a subset of objectives to generate a new aggregate objective in the aggregate objective table.

19 Claims, 5 Drawing Sheets

GUI FOR GOAL PROGRAMMING AND GOAL WEIGHTING IN OPTIMIZATION BASED APPLICATIONS

BACKGROUND OF THE INVENTION

1. Field of the Invention

The present invention relates to mathematical programming for optimization based applications in general and more particularly to an apparatus and method for providing a goal programming and goal weighting user interface.

2. Description of the Related Art

Mathematical Programming, a branch of Operations Research is one of the fundamental drivers of productivity improvement in the industrial age. Operations Research's main techniques rely on powerful algorithms such as linear programming. Those methods require its user, a specially trained technician with a significant background in mathematics, to model the behavior of complex machinery, such as a full industrial plant, as a set of mathematical constraints. Those constraints link, for instance, the capacity of production of a machine to its energy consumption, its cost and the time taken for a given production. Once the constraints are described (the model is defined), the user needs to define an objective of production. That is to say, describe a desired production to be achieved in the form of variable instantiations, as well as a further set of mathematical equations involving a further set of variables which must be optimized. For instance, to say that the cost of a production should be minimized, the user will specify a constraint (as a linear expression of variables and ponderations) under the form of "The sum of all the costs induced by each piece of machinery used in the production is to be as small as possible".

One important aspect of the objective function is that it involves a multiplicity of concurring aspects such as Final Cost, Workload, Regulations and Delays to name a few. All these aspects need to be balanced against each other properly and hierarchized (for example, try to minimize first the final cost, then, once within a reasonably small cost estimate, try to minimize the workload, and finally the time taken to create a given production).

The specification of the constraints to be respected requires, for the most part, a deep technical knowledge of the machinery and some expertise with the mathematics involved in the description. However, the specification of the goals to be reached, and their balance, involves more strategic decisions, which are related to the business and susceptible to evolve over time. Consequently, non-technical users must be allowed to specify, or at least, customize the objective functions, without requiring a complete understanding of the underlying mathematics involved in the optimization process. This requires informing as much as possible the user about the meaning of the expression they enter, as well as preventing nonsensical entries.

In this sense, goal weighting consists in combing an arbitrary number of objectives (also known as "goals"), by multiplying each goal by a real number (coefficient), and adding the results together, thus building a unique "super-goal". Goal programming consists in sequencing an arbitrary number of goals. Each goal is then optimized in sequence, and the value obtained for goal at step n is input as a constraint for step n+1. Rather notable is that most operations research experts use goal weighting rather than goal programming, because goal programming requires an ad hoc programmatic implementation. It would be advantageous to combine both goal weighting and goal programming by first assembling goals in super-goals (weighting) and then sequencing the super-goals.

BRIEF SUMMARY OF THE INVENTION

Embodiments of the present invention address deficiencies of the art in respect to mathematical programming for optimization based applications systems and provide a novel and non-obvious method, system and computer program product for providing an interface for generating and customizing optimization-based applications. In an embodiment of the invention, a method for providing an interface for generating and customizing optimization-based applications is provided. The method for providing an interface for generating and customizing optimization-based applications can include generating an initial user interface having an objectives and sequences panel, the objectives and sequences panel can include a basic objective table, an aggregate objective table and an objective sequence table in a goal programming and goal weighting controller module executing in memory by a processor of a host computer. The method also includes rendering in the basic objective table a list of goals with corresponding indexes provided by the optimization application. The method further includes receiving selection of a subset of objectives to generate a new aggregate objective in the aggregate objective table. The method yet further includes receiving a naming designation for the selected subset of objectives along with corresponding indexes and UOM and receiving an assignment of weight for each of the objectives in the selected subset of objectives. Finally, the method includes receiving a collection of indexes for each of the objectives in the selected subset of objectives in the objective sequence table and receiving an optimization direction for each of the objectives in the selected subset of objectives.

The method further includes receiving a corresponding unit of measure (UOM) with the naming designation for the selected subset of objectives, applying a classical OR approach for a goal programming algorithm, where the applying a classical OR approach for a goal programming algorithm includes flattening expressions, flattening sequences, iterating for each objective in the main sequence, testing for unicity success, optimizing an objective under current restraints and applying an objective optimization direction.

In another embodiment of the invention, a data processing system for providing an interface for generating and customizing optimization-based applications can be provided. The system can include a host computer with processor and memory and an optimization system executing in the host computer. The system further can include a goal programming and goal weighting controller module coupled to the optimization system. The goal programming and goal weighting controller module can include program code for generating an initial user interface having an objectives and sequences panel, the objectives and sequences panel including a basic objective table, an aggregate objective table and an objective sequence table in a goal programming and goal weighting controller module executing in memory by a processor of a host computer, for rendering in the basic objective table a list of goals with corresponding indexes and units of measure (UOM) provided by an optimization application, for receiving selection of a subset of objectives to generate a new aggregate objective in the aggregate objective table, for receiving a naming designation for the selected subset of objectives along with corresponding indexes and for receiving an assignment of weight for each of the objectives in the selected subset of objectives.

In one aspect of the embodiment, the program code of the goal programming and goal weighting controller module is further enabled to receive a collection of indexes for each of the objectives in the selected subset of objectives in the objective sequence table.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for generating and customizing optimization-based applications. In accordance with an embodiment of the invention, a method, system and computer program product for providing an interface for generating and customizing optimization-based applications is provided. In an embodiment of the invention, a method for providing an interface for generating and customizing optimization-based applications is provided. The method for providing an interface for generating and customizing optimization-based applications can include generating an initial user interface having an objectives and sequences panel, the objectives and sequences panel can include a basic objective table, an aggregate objective table and an objective sequence table in a goal programming and goal weighting controller module executing in memory by a processor of a host computer. The method also includes rendering in the basic objective table a list of goals with corresponding indexes provided by the optimization application. The method further includes receiving selection of a subset of objectives to generate a new aggregate objective in the aggregate objective table. The method yet further includes receiving a naming designation for the selected subset of objectives along with corresponding indexes and UOM and receiving an assignment of weight for each of the objectives in the selected subset of objectives. Finally, the method includes receiving a collection of indexes for each of the objectives in the selected subset of objectives in the objective sequence table and receiving an optimization direction for each of the objectives in the selected subset of objectives.

Figure 1:
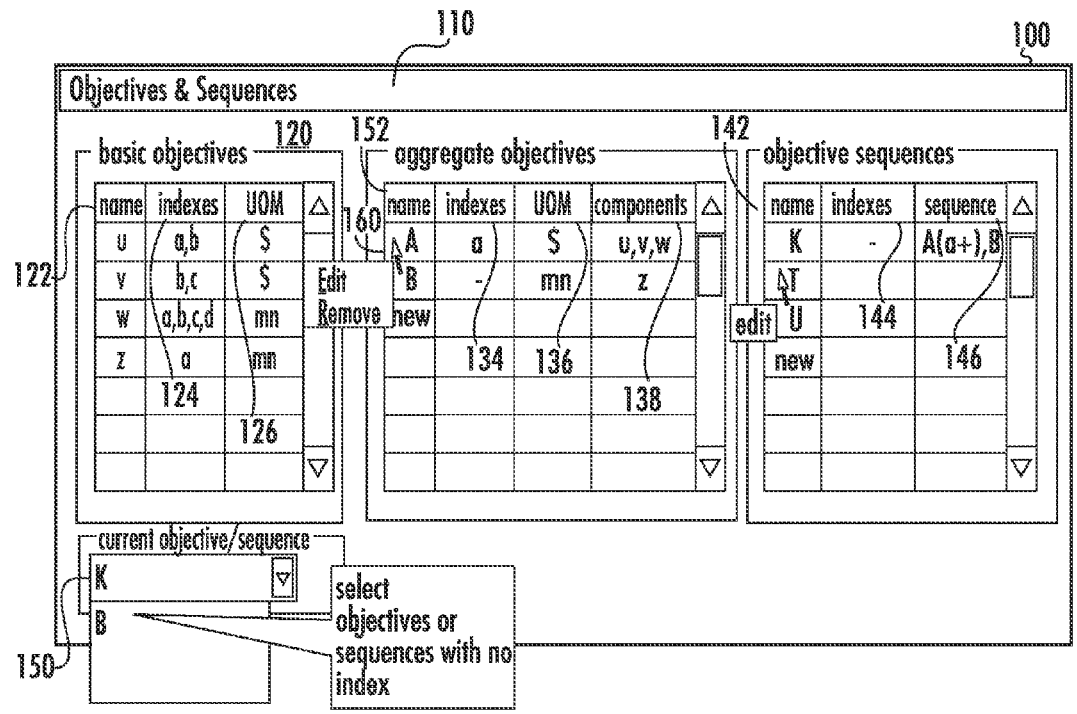
FIG. 1 is pictorial illustration of a graphical user interface (GUI) for generating and customizing optimization-based applications.

In illustration, FIG. 1 is pictorial illustration of a graphical user interface (GUI) for generating and customizing optimization-based applications. As shown in FIG. 1, a user interface 100 can be provided to display an objectives and sequences component 110, which includes a basic objective table 120, an aggregate objective table 130 and an objective sequence table 140. The basic objective table 120 displays a list of objectives names 122 provided by an optimization application, together with their corresponding indexes 124, and unit of measure (UOM) 126. Each index 124 is supposed to have a full order. The aggregate objective table 130 displays a list of aggregate objective names 132, together with their corresponding indexes 134, unit of measure (UOM) 136 and components 138. The components 138 can be basic objectives as well as aggregate tables. The objective sequences table 140 displays a list of objective sequence names 142, together with their corresponding indexes 144, and a symbolic representation of the sequence 146. FIG. 1 shows that objective sequence K is made of the sequencing all "A's" by increasing "a" and then "B".

Figure 2:
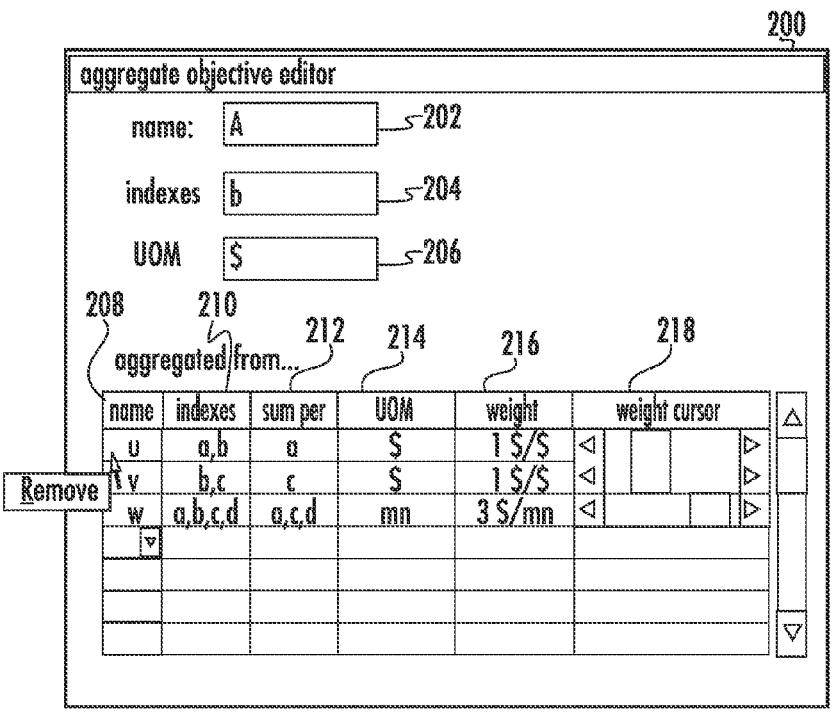
FIG. 2 is pictorial illustration of a graphical user interface (GUI) for generating an aggregate objective table for customizing optimization-based applications.

In response to the selection by a pointing device 160 of an icon named "new" in the last row of aggregate objectives panel 130, an aggregate objective editor display 200 can be displayed to create a new aggregate objective. As illustrated in FIG. 2, the name of the aggregate objective is provided in field 202 as "A" and has indexes "b" 204 and a corresponding UOM of "$" 206. Column 208 contains a list of the names of the objectives, for example, "u", "v" and "w", with their corresponding indexes 210, "sum per" column 212 and UOM 214. As shown in the "sum per" column 212, when aggregating on a specified index that specified index will no longer be in the index signature of the resulting expression. When an user wishes to add a new component in the aggregation, it suffices to use the drop list of the last row of the aggregate objectives table 130, which presents only basic and aggregate objectives that include the indexes 204 (here: b) of the target expression (here: A) 202.

Figure 3:
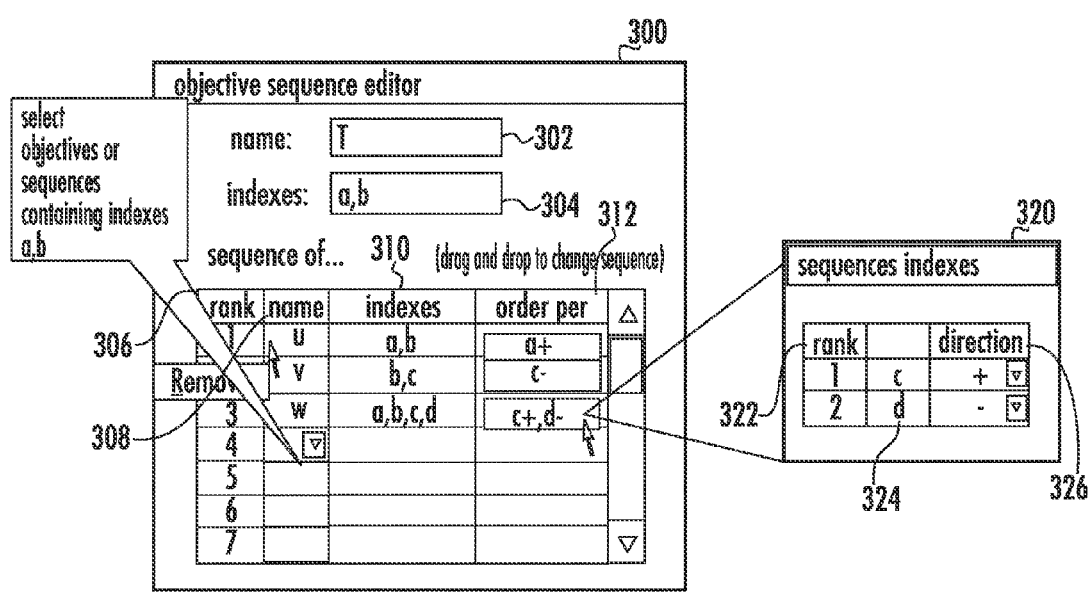
FIG. 3 is pictorial illustration of a graphical user interface (GUI) for generating an objective sequence table for customizing optimization-based applications.

FIG. 3 is pictorial illustration of a graphical user interface (GUI) for generating an objective sequence table for customizing optimization-based applications. Of note, the objective sequence editor 300 is based on the same principle as the aggregate objective editor 200, except that expressions are ranked instead of weighted. Rank can be changed by moving rows up or down using drag and drop. As illustrated in FIG. 3, the name of the aggregate objective is provided in field 302 as "T" and has indexes "a, b" 304. Column 306 contains a list of the ranks for each of the expression names in column 308 for example, "u", "v" and "w", with their corresponding indexes 310, and "order per column" 312. As shown in FIG. 3, when the user adds a new expression "w" using the drop list of column 308, then the "order per column" is populated with the indexes in this expression "w", minus the indexes of the expression being edited (here: T). In this example, this results in "c" and "d". The user than needs to specify how "c" and "d" are ranked 322, and if they are in increasing or decreasing order 326. This is the purpose of the "sequence indexes" panel 320 (based on drop list and drag and drop up/down for ranking 322).

Figure 4:
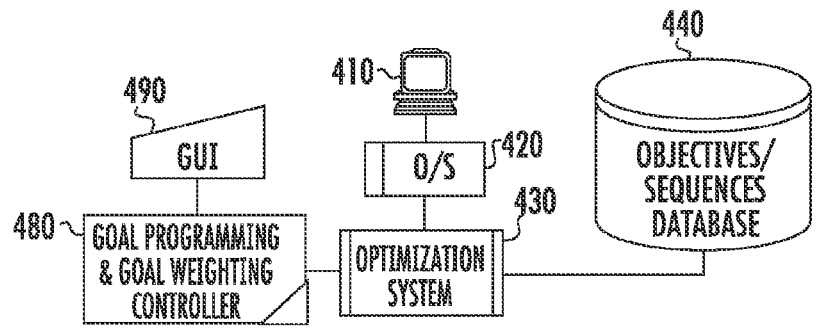
FIG. 4 is a schematic illustration of a data processing system configured for generating and customizing optimization-based applications.

The process described in connection with FIGS. 1, 2 and 3 can be implemented in a data processing system for providing an interface for generating and customizing optimization-based applications. In yet further illustration, FIG. 4 schematically shows a data processing system configured for providing an interface for generating and customizing optimization-based applications. The system can include a host computer 210 with at least one processor and memory. The host computer 210 can be configured for communicative coupling to optimization system 470 and goal programming and goal weighting controller 480.

The host computer 410 can include an operating system 460 executing by one or more of the processors in the memory of the host computer 410. An optimization system 470, in turn, can be hosted by the operating system 460. The optimization system 470 can include functionality sufficient to acquire production metrics for the different manufacturing lines and store them in a database, such as the objectives/sequences database 440. Other production metrics acquirable by the optimization system 470 include final costs, workload, regulations, delays and the like.

Notably, a goal programming and goal weighting controller 480 can be coupled to the optimization system 470 and can execute in the memory by one or more of the processors of the host computer 410. The controller module 480 can include program code enabled to display in a GUI 490 an objectives and sequences panel 110, where the objectives and sequences panel 110 including a basic objective table 120, an aggregate objective table 130 and an objective sequence table 140. The controller module 480 further can include program code enabled to render in the basic objective table a list of goals with corresponding indexes and units of measure (UOM) provided by the optimization application. The module 280 yet further can include program code enabled to receive a selection of a subset of objectives to generate a new aggregate objective in the aggregate objective table.

Figure 5:
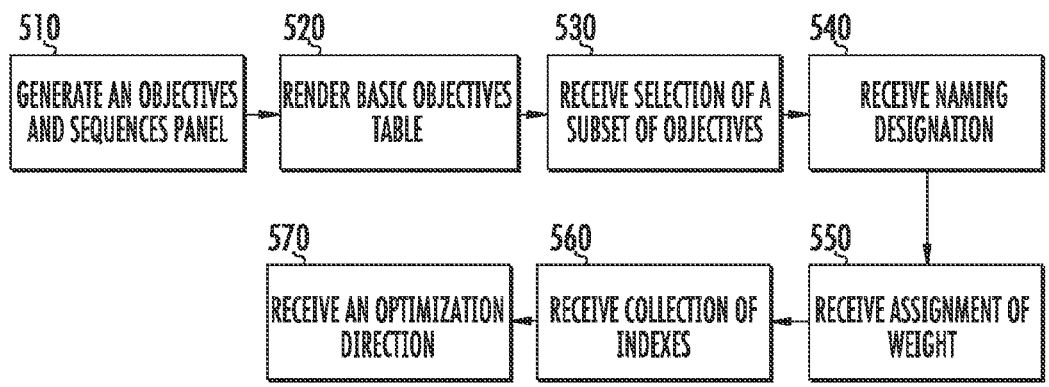
FIG. 5 is a flow chart illustrating a process for generating and customizing optimization-based applications.

In even yet further illustration of the operation of the controller module 480, FIG. 5 is a flow chart illustrating a process for generating and customizing optimization-based applications. Beginning in block 510, the controller module 480 can generate an initial user interface having an objectives and sequences panel, the objectives and sequences panel including a basic objective table, an aggregate objective table and an objective sequence table by a processor of a host computer. In block 520, a list of goals with corresponding indexes and units of measure (UOM) provided by the optimization application can be rendered for a basic objective table and in block 530, a selection of a subset of objectives to generate a new aggregate objective in the aggregate objective table can be received. In block 540, a naming designation for the selected subset of objectives along with corresponding indexes and UOM can be received.

In block 550, an assignment of weight for each of the objectives in the selected subset of objectives can be received. In block 560, a collection of indexes for each of the objectives in the selected subset of objectives in the objective sequence table can be received. Thereafter, in block 570 an optimization direction for each of the objectives in the selected subset of objectives can be received.

Figure 6:
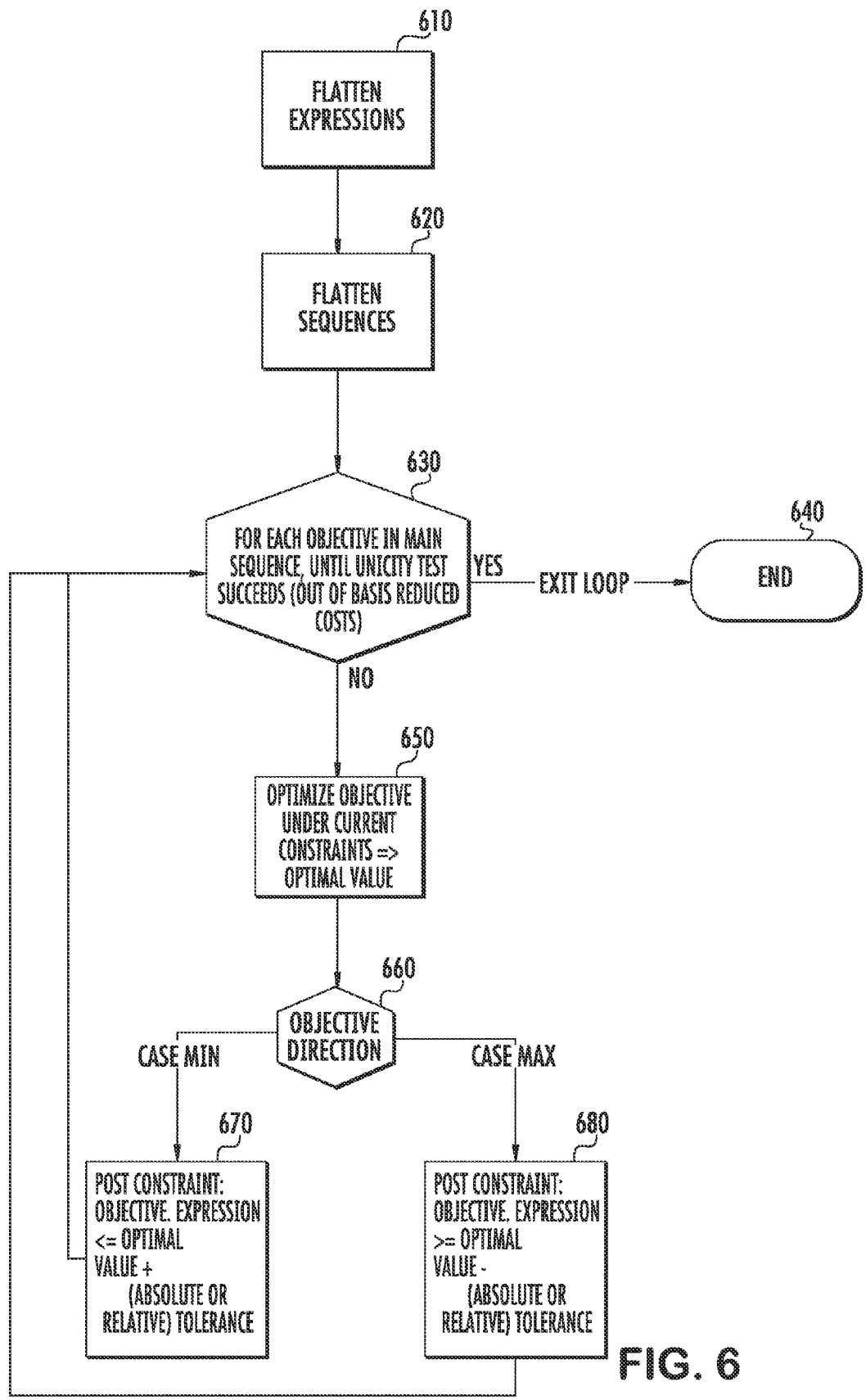
FIG. 6 is a flow chart illustrating a process for applying a classical OR approach for goal programming; and, FIG. 7 is a unified modeling language (UML) diagram illustrating a process for generating and customizing optimization-based applications.

In even yet further illustration of the operation of the controller module 480, FIG. 6 is a flow chart illustrating a process for applying a classical OR approach for goal programming. Beginning in block 610, the controller module 480 can flatten the expressions and in block 620, controller module 480 can flatten the expressions general by the process for generating and customizing optimization-based applications illustrated in FIG. 5. In block 630, each objective in a main sequence can be iterated and tested until unicity is reached. If unicity is reached the process can end at block 640. On the other hand, if unicity is not reached the objective can be optimized under current constraints in block 650. In block 660, an objective optimization can be selected. If the case maximum is selected then in block 680 the post constraint is an objective expression which is greater than or equal to the optimal value minus an absolute or relative tolerance value. Otherwise, if the case minimum is selected, then in block 670, the post constraint is an objective expression which is less than or equal to the optimal value plus an absolute or relative tolerance value.

Figure 7:
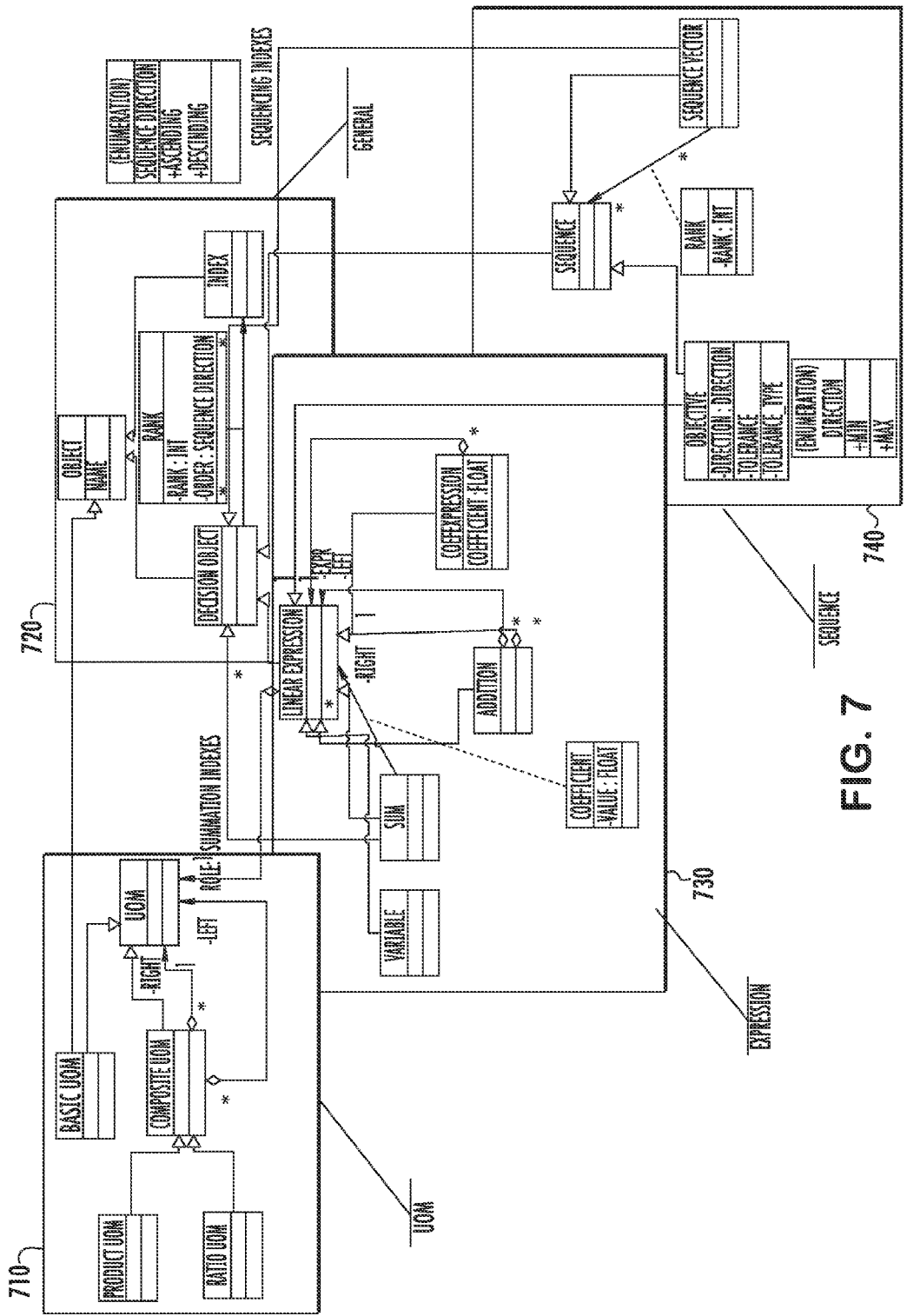

In even yet further illustration, FIG. 7 is a unified modeling language (UML) diagram illustrating a process for generating and customizing optimization-based applications. Block 710 is the unit of measure (UOM) block. In embodiments, the UOM can be either a "Basic UOM", for example a meter, a gallon, a kilogram and the like, or a "Composite UOM", which is built from two unit of measures. In embodiments, the Composite UOM can be generate either by product, for example "Product UOM", or can be generated by ratio, for example "Ratio UOM". Examples of the Composite UOM include "meter/gallon" and "kilogram*second", where "kilogram" is the "left" component, "second" is the "right" component). The Composite UOM can also be recursively applied, for example "meter/second*kilogram".

Block 720 is the General block. "Object" is the most generic class, which supports the "name" attribute, thus allowing persistence of the UML model in multiple possible formats (entity relationship for relational databases, or XML for example). "Object" of the General block 720 also allows the user to create meaningful names in the GUI. Objects can be either "Basic UOM", "Decision Objects" or "Indexes". A (ranked) set of indexes "indexes" decorate decision objects, allowing usual mathematical notation like X(i,j,k), where "i" is the first index, "j" is the second index and "k" is the third index.

Block 730 is the Expressions Block. "Linear Expressions" are "decision objects" that have a "unit of measure (UOM)". A "linear expression" can be either" a "variable" (that is a simple decision variable), or the sum ("Sum" class) of many linear expressions, the addition (class "addition)" of two linear expression, or the product of any linear expressions by a constant coefficient (class "CoefExpression", the value of which is the float attribute "Coefficient").

Block 740 is the Sequence Block. A "sequence" is a "decision object" that can be either: 1) an "objective" (with a direction "min"—meaning the objective has to be minimized by the MIP engine, or a direction "max"—meaning the objective has to be maximized by the MIP engine) or 2) a "sequence vector" (which is itself a "decision object"), which is a set of ranked objectives. For example: if o1, o2 and o3 are objectives, a sequence s0=<o1, o2, o3> can be built from it. This process also can apply recursively. From example, build s1=<o1, o2>, and s2=<o3,s1>. The sequence direction is either ascending (in the order of the indexes) or descending (in the reverse order).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method, executing in memory of a data processing system, for providing an interface for generating and customizing optimization-based applications, the method comprising:
   generating an initial user interface having an objectives and sequences panel, the objectives and sequences panel including a basic objective table, an aggregate objective table and an objective sequence table in a goal programming and goal weighting controller module executing in memory by a processor of a host computer;
   rendering in the basic objective table a list of goals with corresponding indexes and units of measure (UOM) provided by an optimization application;
   receiving selection of a subset of objectives to generate a new aggregate objective in the aggregate objective table;
   receiving a naming designation for the selected subset of objectives along with corresponding indexes; and,
   receiving an assignment of weight for each of the objectives in the selected subset of objectives.

2. The method of claim 1, further comprising receiving a collection of indexes for each of the objectives in the selected subset of objectives in the objective sequence table.

3. The method of claim 1, further comprising receiving an optimization direction for each of the objectives in the selected subset of objectives.

4. The method of claim 1, further comprising receiving a corresponding unit of measure (UOM) with the naming designation for the selected subset of objectives.

5. The method of claim 4, further comprising applying a classical OR approach for a goal programming algorithm.

6. The method of claim 5, wherein the applying a classical OR approach for a goal programming algorithm comprises:
   flattening expressions;
   flattening sequences;
   iterating for each objective in the main sequence;
   testing for unicity success;
   optimizing objective under current restraints; and
   applying an objective optimization direction.

7. A data processing system for providing an interface for generating and customizing optimization-based applications, the system comprising:
   a host computer with processor and memory;
   an goal programming and goal weighting controller executing in the host computer and controlling the generation of a user interface for generating and customizing optimization-based applications in a optimization system communicatively coupled to the host computer; and,
   the goal programming and goal weighting controller module comprising program code for generating an initial user interface having an objectives and sequences panel, the objectives and sequences panel including a basic objective table, an aggregate objective table and an objective sequence table in a goal programming and goal weighting controller module executing in memory by a processor of a host computer, for rendering in the basic objective table a list of goals with corresponding indexes and units of measure (UOM) provided by an optimization application, for receiving selection of a subset of objectives to generate a new aggregate objective in the aggregate objective table, for receiving a naming designation for the selected subset of objectives along with corresponding indexes and for receiving an assignment of weight for each of the objectives in the selected subset of objectives.

8. The system of claim 7, wherein the program code of the goal programming and goal weighting controller module is further enabled to receive a collection of indexes for each of the objectives in the selected subset of objectives in the objective sequence table.

9. The system of claim 7, wherein the program code of the goal programming and goal weighting controller module is further enabled to receive an optimization direction for each of the objectives in the selected subset of objectives.

10. The system of claim 7, wherein the program code of the goal programming and goal weighting controller module is further enabled to receive a corresponding unit of measure (UOM) with the naming designation for the selected subset of objectives.

11. The system of claim 10, wherein the program code of the goal programming and goal weighting controller module is further enabled to receive a corresponding unit of measure (UOM) with the naming designation for the selected subset of objectives.

12. The system of claim 11, wherein the program code of the goal programming and goal weighting controller module is further enabled to apply a classical OR approach for a goal programming algorithm.

13. The system of claim 12, wherein the program code for the applying a classical OR approach for a goal programming algorithm comprises:
   flattening expressions;
   flattening sequences;
   iterating for each objective in the main sequence;
   testing for unicity success;
   optimizing an objective under current restraints; and
   applying an objective optimization direction.

14. A computer program product for providing an interface for generating and customizing optimization-based applications, the computer product comprising:
   a computer readable storage medium having computer readable program code embodied therewith, the computer readable program code comprising:
   computer readable program code for generating an initial user interface having an objectives and sequences panel, the objectives and sequences panel including a basic objective table, an aggregate objective table and an objective sequence table in a goal programming and goal weighting controller module executing in memory by a processor of a host computer;
   computer readable program code for rendering in the basic objective table a list of goals with corresponding indexes and units of measure (UOM) provided by an optimization application;
   computer readable program code for receiving selection of a subset of objectives to generate a new aggregate objective in the aggregate objective table;
   computer readable program code for receiving a naming designation for the selected subset of objectives along with corresponding indexes; and,
   computer readable program code for receiving an assignment of weight for each of the objectives in the selected subset of objectives.

15. The computer program product of claim 14, further comprising computer readable program code for receiving a collection of indexes for each of the objectives in the selected subset of objectives in the objective sequence table.

16. The computer program product of claim 14, further comprising computer readable program code for receiving an optimization direction for each of the objectives in the selected subset of objectives.

17. The computer program product of claim 14, further comprising computer readable program code for receiving a corresponding unit of measure (UOM) with the naming designation for the selected subset of objectives.

18. The computer program product of claim 17, further comprising computer readable program code for further comprising applying a classical OR approach for a goal programming algorithm.

19. The computer program product of claim 18, wherein the computer readable program code for applying a classical OR approach for a goal programming algorithm comprises:
flattening expressions;
flattening sequences;
iterating for each objective in the main sequence;
testing for unicity success;
optimizing an objective under current restraints; and
applying an objective optimization direction.

* * * * *